US010692205B2

(12) United States Patent
Hartshorn et al.

(10) Patent No.: US 10,692,205 B2
(45) Date of Patent: Jun. 23, 2020

(54) GENERATION OF AGGREGATE ULTRASOUND IMAGES BASED ON DETECTION OF CONSTELLATIONS IN OVERLAPPING ULTRASOUND IMAGES

(71) Applicant: The Boeing Company, Chicago, IL (US)

(72) Inventors: Scott Hartshorn, Snohomish, WA (US); Keith Daniel Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 209 days.

(21) Appl. No.: 15/717,629

(22) Filed: Sep. 27, 2017

(65) Prior Publication Data
US 2019/0096051 A1 Mar. 28, 2019

(51) Int. Cl.
*G06T 7/70* (2017.01)
*G06T 5/50* (2006.01)
*G01N 29/44* (2006.01)
*G06T 7/00* (2017.01)
(Continued)

(52) U.S. Cl.
CPC .......... *G06T 7/001* (2013.01); *G01N 29/069* (2013.01); *G01N 29/0654* (2013.01); *G01N 29/262* (2013.01); *G06T 5/50* (2013.01); *G06T 7/70* (2017.01); *G01N 29/0609* (2013.01); *G01N 29/4463* (2013.01); *G01N 2291/017* (2013.01); *G01N 2291/0231* (2013.01); *G01N 2291/0289* (2013.01); *G01N 2291/044* (2013.01); *G06T 2207/10132* (2013.01); *G06T 2207/20221* (2013.01); *G06T 2207/30164* (2013.01)

(58) Field of Classification Search
None
See application file for complete search history.

(56) References Cited

U.S. PATENT DOCUMENTS 7,413,502 B2 * 8/2008 Mandler ............. B24B 13/0057
451/323
2012/0065494 A1 * 3/2012 Gertner .................. A61B 5/055
600/411
(Continued)

OTHER PUBLICATIONS

David Rosen; Rigid Body Transformation; Georgia Institute of Technology; http://faculty.petra.acid/resmana/private/compvision/web; Aug. 11, 2017.
(Continued)

*Primary Examiner* — Tahmina N Ansari
(74) *Attorney, Agent, or Firm* — Duft & Bornsen, PC (57) ABSTRACT

Systems and methods are provided for ultrasonic image generation. One embodiment is a method that includes capturing a first ultrasound image that represents a first volume within a part, and capturing a second ultrasound image that represents a second volume that partially overlaps the first volume. The method also includes identifying a first constellation comprising at least three inconsistencies in the part that are depicted in the first ultrasound image, identifying a second constellation, comprising a reoriented version of the first constellation, in the second ultrasound image, and generating an aggregate image that combines the first ultrasound image with the second ultrasound image.

27 Claims, 9 Drawing Sheets

(51) Int. Cl.
*G01N 29/06* (2006.01)
*G01N 29/26* (2006.01)

(56) References Cited

U.S. PATENT DOCUMENTS

2019/0096051 A1* 3/2019 Hartshorn ............ G01N 29/262
2019/0117186 A1* 4/2019 Klinder .................. G06T 7/344

OTHER PUBLICATIONS

Document mosaicing; Wikipedia; Aug. 17, 2017.
Ultrasound; Wikipedia; Aug. 11, 2017.

* cited by examiner

GENERATION OF AGGREGATE ULTRASOUND IMAGES BASED ON DETECTION OF CONSTELLATIONS IN OVERLAPPING ULTRASOUND IMAGES

FIELD

The disclosure relates to the field of Non-Destructive Imaging (NDI), and in particular, to ultrasound imaging.

BACKGROUND

Ultrasound imaging may be utilized to engage in NDI of composite parts (and/or other parts) in order to detect features within those parts. Features may range from pores in the parts, to the locations of holes at which fasteners are inserted into the parts, to gaps or overlap between placed tows/layers, drop offs, etc.

Ultrasound imaging is highly desirable because it is non-destructive. However, ultrasound imaging becomes complicated when imaging large composite parts, such as parts that are tens of feet long. Ultrasound transducers are only capable of imaging a very limited portion of a large composite part. Thus, in order to analyze a large composite part in its entirety, multiple ultrasound images must be taken by a transducer. Furthermore, the precise location and orientation of the transducer must be recorded for each image that is taken. This in turn may require the use of precision actuators or sensors that track the ultrasound transducer, substantially increasing cost and/or the time needed to scan. This increased cost limits the feasibility of imaging large composite parts.

Therefore, it would be desirable to have a method and apparatus that take into account at least some of the issues discussed above, as well as other possible issues.

SUMMARY

Embodiments described herein combine multiple ultrasound images together into an, by identifying common features shared between the ultrasound images. The ultrasound images are aligned based on the positions of those features in the images, resulting in an utilizing a single coordinate space. This allows for a single image to represent an entire part, which facilitates inspection of the part.

One embodiment is a method that includes capturing a first ultrasound image that represents a first volume within a part, and capturing a second ultrasound image that represents a second volume that partially overlaps the first volume. The method also includes identifying a first constellation comprising at least three inconsistencies in the part that are depicted in the first ultrasound image, identifying a second constellation, comprising a reoriented version of the first constellation, in the second ultrasound image, and generating an aggregate image that combines the first ultrasound image with the second ultrasound image.

A further embodiment is a non-transitory computer readable medium embodying programmed instructions which, when executed by a processor directing a transducer, are operable for performing a method. The method includes identifying a first constellation comprising at least three inconsistencies in the part that are depicted in a first ultrasound image that represents a first volume within a part, and identifying a second constellation comprising a reoriented version of the first constellation. The second constellation is in a second ultrasound image that represents a second volume that partially overlaps the first volume. The method also includes determining that distances between inconsistencies in the first constellation correspond with distances between inconsistencies in the second constellation, revising a coordinate space of the second ultrasound image such that the second constellation is coincident with the first constellation, and generating an aggregate image that combines the first ultrasound image with the second ultrasound image after the coordinate space of the second ultrasound image has been revised.

A further embodiment is a system that includes: an imaging system comprising an interface, a controller, and a memory. The controller receives a first ultrasound image that represents a first volume within a part, and receives a second ultrasound image representing a second volume that partially overlaps the first volume, and stores the first ultrasound image and the second ultrasound image in the memory. The controller identifies a first constellation comprising at least three inconsistencies in the part that are depicted in the first ultrasound image, and identifies a second constellation comprising at least three inconsistencies in the part that are depicted in the second ultrasound image. The controller determines that distances between inconsistencies in the first constellation correspond with distances between inconsistencies in the second constellation, and revises a coordinate space of the second ultrasound image such that the second constellation is coincident with the first constellation. The controller requests generation of an aggregate image that combines the first ultrasound image with the second ultrasound image after the coordinate space of the second ultrasound image has been revised.

A further embodiment is an apparatus. The apparatus includes a memory that stores ultrasound images of a part, and a controller that identifies a first constellation comprising at least three inconsistencies in the part that are depicted in a first ultrasound image, and identifies a second constellation comprising at least three inconsistencies in the part that are depicted in a second ultrasound image. The controller determines that distances between inconsistencies in the first constellation correspond with distances between inconsistencies in the second constellation, and revises a coordinate space of the second ultrasound image such that the second constellation is coincident with the first constellation. The controller requests generation of an aggregate image that combines the first ultrasound image with the second ultrasound image after the coordinate space of the second ultrasound image has been revised.

A further embodiment is a method. The method includes capturing a first ultrasound image that represents a first volume within a part, and capturing a second ultrasound image that represents a second volume that partially overlaps the first volume. The method also includes identifying a first constellation comprising at least three inconsistencies in the part that are depicted in the first ultrasound image, identifying a second constellation, comprising a reoriented version of the first constellation, in the second ultrasound image, and generating an aggregate image that combines the first ultrasound image with the second ultrasound image.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
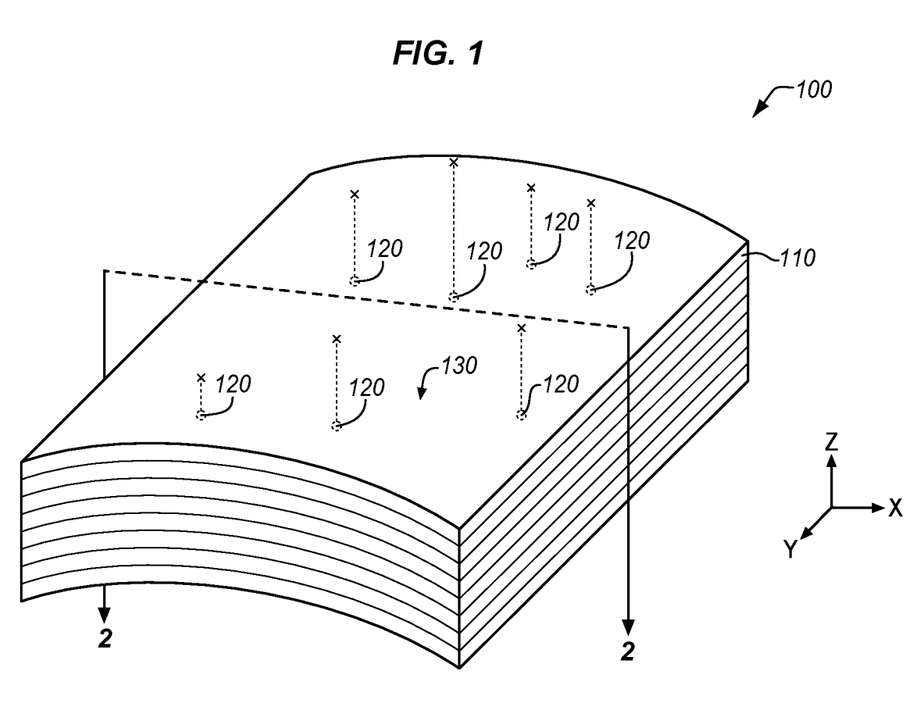
FIG. 1 is a diagram of a part in an illustrative embodiment.

FIG. 1 illustrates a perspective view of part 100 in an illustrative embodiment. In this embodiment, part 100 includes layers 110, which may comprise hardened resin (not shown) as well as fibers (not shown). Inconsistencies 120 are also illustrated in FIG. 1. Inconsistencies 120 are hidden beneath surface 130 of part 100. In such circumstances, inconsistencies 120 are incapable of being directly visually detected because they have no externally discernible details. Hence, the presence of the inconsistencies would be unknown without engaging in testing.

In one embodiment, part 100 comprises a composite part, such as Carbon Fiber Reinforced Polymer (CFRP) part, which is initially laid-up in layers that together form a laminate. Individual fibers within each layer of the laminate are aligned parallel with each other, but different layers may exhibit different fiber orientations in order to increase the strength of the resulting composite part. The laminate may include a resin that solidifies at increased temperature in order to harden the laminate into the composite part (e.g., for use in an aircraft). For thermoset resins, the hardening is a one-way process referred to as curing, while for thermoplastic resins, the resin may return to liquid form if it is re-heated.

Figure 2:
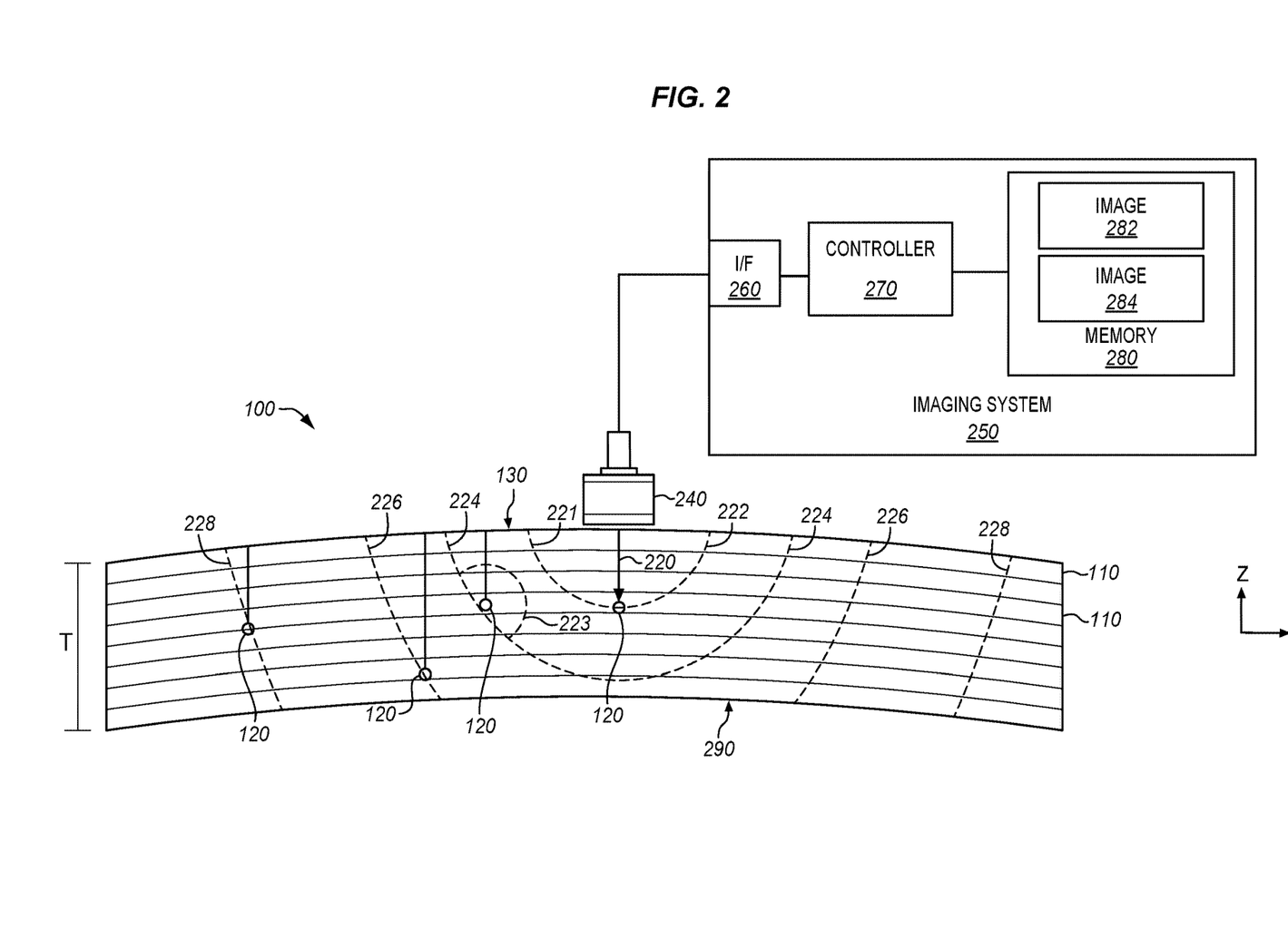
FIG. 2 is a cut-through view of the part of FIG. 1 being analyzed by an imaging system in an illustrative embodiment.

FIG. 2 illustrates a cut-through view of part 100 in an illustrative embodiment indicated by view arrows 2 of FIG. 1. FIG. 2 also illustrates transducer 240 and imaging system 250. Transducer 240 generates ultrasonic wave 220 at surface 130, which travels through a thickness/depth (T) of part 100. Transducer 240 also receives reflected wave 223 after ultrasonic wave 220 has reflected off of lower surface 290 of part 100, or off of an inconsistency 120 within part 100. Transducer 240 may comprise, for example, a phased array transducer.

Ultrasonic wave 220 is expected to travel through thickness T of part 100 to lower surface 290, and reflect off of lower surface 290. If portions of ultrasonic wave 220 are reflected and a reflected wave 223 is received back at transducer 240 within a certain period of time, the reflected wave 223 is known to have reflected off of lower surface 290. Controller 270 may determine the period of time for each reflected wave 223 based on the angle at which a corresponding portion of ultrasonic wave 220 was transmitted from transducer 240.

Inconsistencies 120 have a substantially altered elastic modulus than the rest of part 100. For example, inconsistencies 120 may comprise pores, voids, or gaps within part 100. Inconsistencies 120 may be in tolerance for part 100. Thus, the mere presence of inconsistencies 120 does not necessarily result in a need for reworking part 100. As used herein, a pore having no definable elastic modulus is considered to have an elastic modulus of zero. In any case, inconsistencies 120 exhibit a different acoustic impedance than the rest of part 100. This means that inconsistencies 120 cause portions of ultrasonic wave 220 to reflect before they reach lower surface 290. Thus, when portions of ultrasonic wave 220 return to transducer 240 earlier than expected, an inconsistency 120 is detected.

As shown in FIG. 2, ultrasonic wave 220 is in shape 222 when it reaches a first of inconsistencies 120, is in shape 224 at a second of inconsistencies 120, is in shape 226 at a third of inconsistencies 120, and is in shape 228 at a fourth of inconsistencies 120. Each time an inconsistency 120 is encountered, a portion of ultrasonic wave 220 is reflected early as reflected wave 223. This may be detected via transducer 240.

Controller 270 receives timing and magnitude input from transducer 240 via interface 260 (e.g., an Ethernet, Small Computer System Interface (SCSI), Universal Serial Bus (USB), or other type of interface), and uses this information to capture an image of part 100. Controller 270 may then store the image in memory 280. As transducer 240 is moved and more images (e.g., image 282, image 284) are captured, they may be stored in memory 280 (e.g., Random Access Memory (RAM), a flash memory device, hard drive, etc.). Measurements indicating the position and orientation of transducer 240 at the time each image was captured is not necessary. Controller 270 may be implemented, for example, as custom circuitry, as a hardware processor executing programmed instructions, or some combination thereof.

Figure 3:
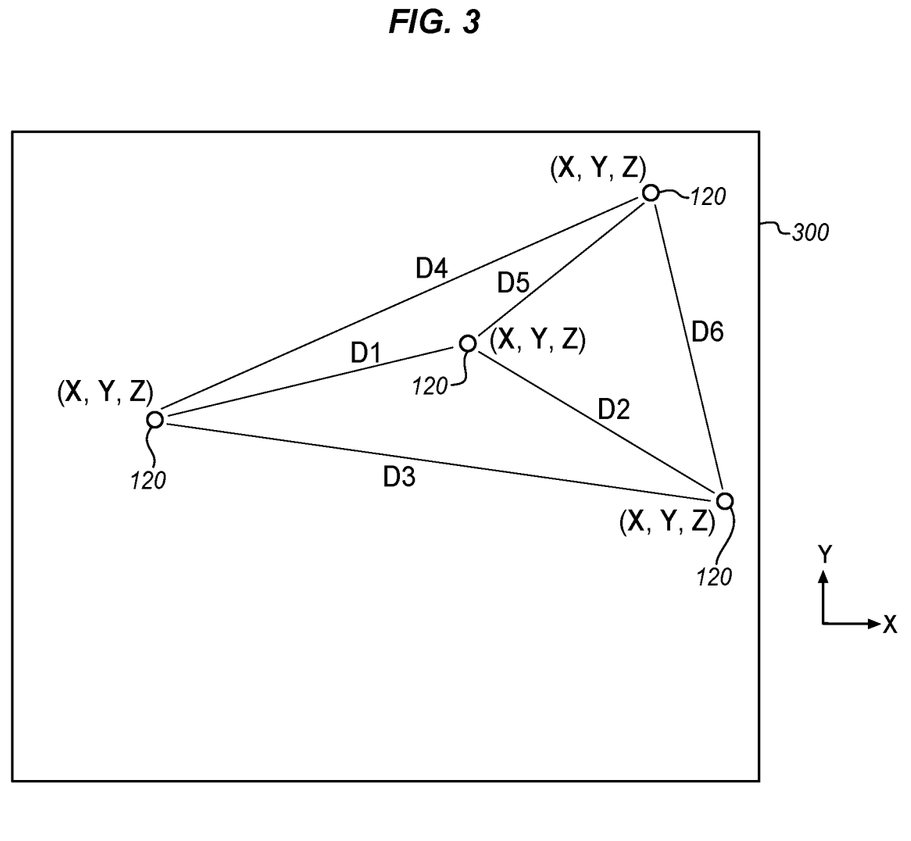
FIG. 3 is a diagram illustrating an ultrasound image of a part in an illustrative embodiment.

FIG. 3 is a diagram illustrating an image 300 of a composite part in an illustrative embodiment. In this embodiment, image 300 comprises a series of picture elements ("pixels"). The X and Y position of each pixel corresponds with a location along surface 130 of part 100. Meanwhile, the Z value of each pixel indicates a depth at which a greatest/highest magnitude of signal was detected. This may be referred to as a "depth map," and a depth map indicates depths for multiple surface locations. The depth of each pixel is either the depth of lower surface 290, or the depth of an inconsistency 120. Controller 270 may identify pixels that represent inconsistencies based on those pixels having depth values (i.e., Z values) that are discontinuous with respect to neighboring pixels along X and Y. A set of at least three inconsistencies having a known spatial relationship to each other (hereinafter, a "constellation") may then be selected by controller 270.

Based on the coordinates (X, Y, Z) provided for each inconsistency, controller 270 may calculate distances between the inconsistencies 120. Thus, as shown in FIG. 3, a set of distances (D1, D2, D3, D4, D5, D6) may be calculated by controller 270. The set of distances may be utilized by controller 270 to identify the constellation (or a portion/subset thereof) in other images. While this discussion is made with regard to under-surface inconsistencies, similar techniques may be applied to any suitable combination of under surface inconsistencies and through surface inconsistencies, such as fastener holes that proceed through a part.

Figure 4:
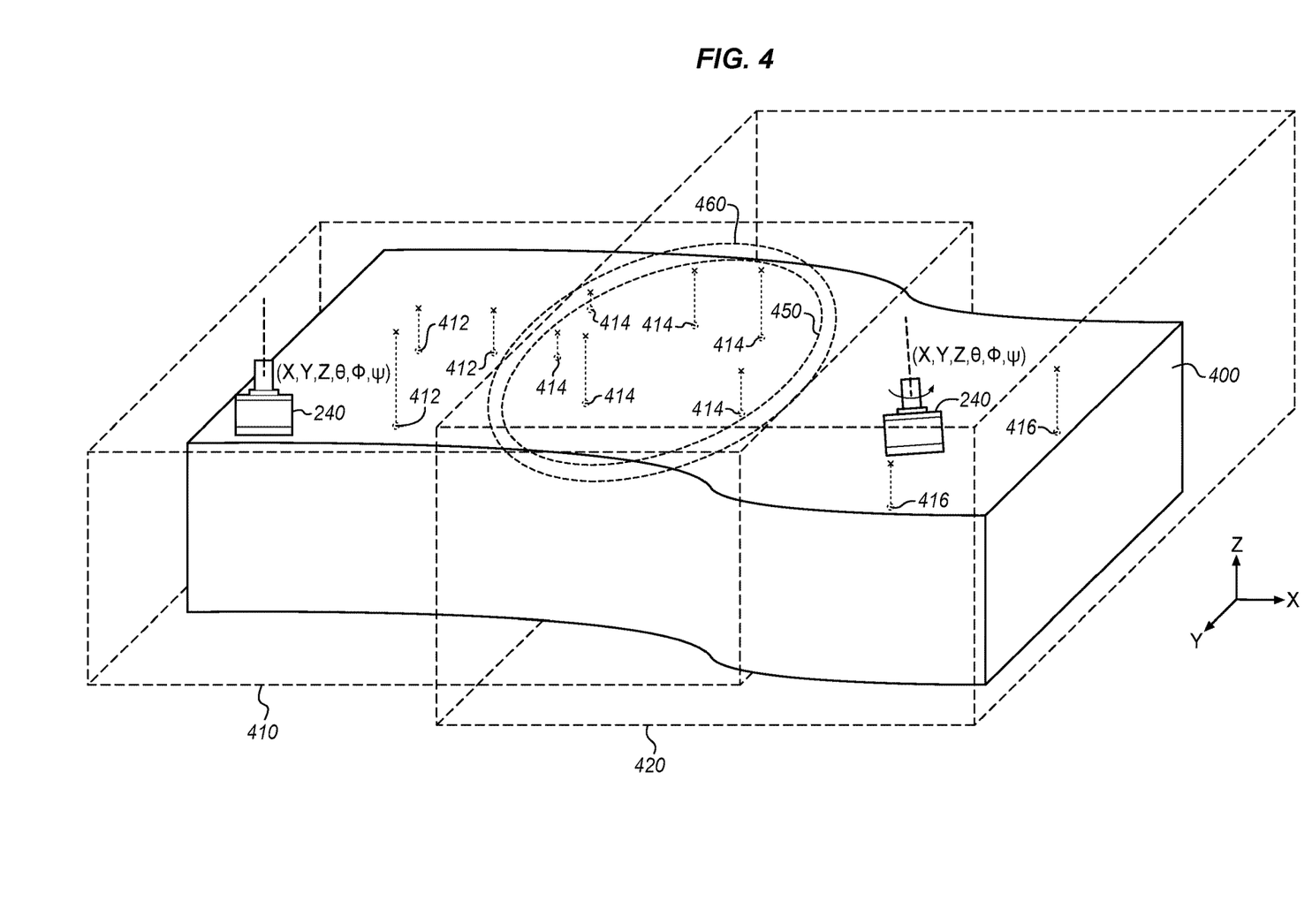
FIG. 4 is a diagram illustrating a part being imaged multiple times in an illustrative embodiment.

FIG. 4 is a diagram illustrating a part 400 being imaged multiple times in an illustrative embodiment. In this embodiment, transducer 240 captures an ultrasound image of first volume 410, including inconsistencies 412 and inconsistencies 414. Transducer 240 also captures an ultrasound image of second volume 420, including inconsistencies 414 and inconsistencies 416. The specific position (X,Y,Z) and orientation ($\theta$, $\Phi$, $\psi$) of transducer 240 need not be known at the time the ultrasound images are captured, so long as at least three inconsistencies are shared between first volume 410 and second volume 420. A method illustrating the combination of such images together into an aggregate image is provided below with respect to FIG. 5.

Illustrative details of the operation of imaging system 250 will be discussed with regard to FIG. 5. Assume, for this embodiment, that part 100 awaits NDI inspection via ultrasound.

Figure 5:
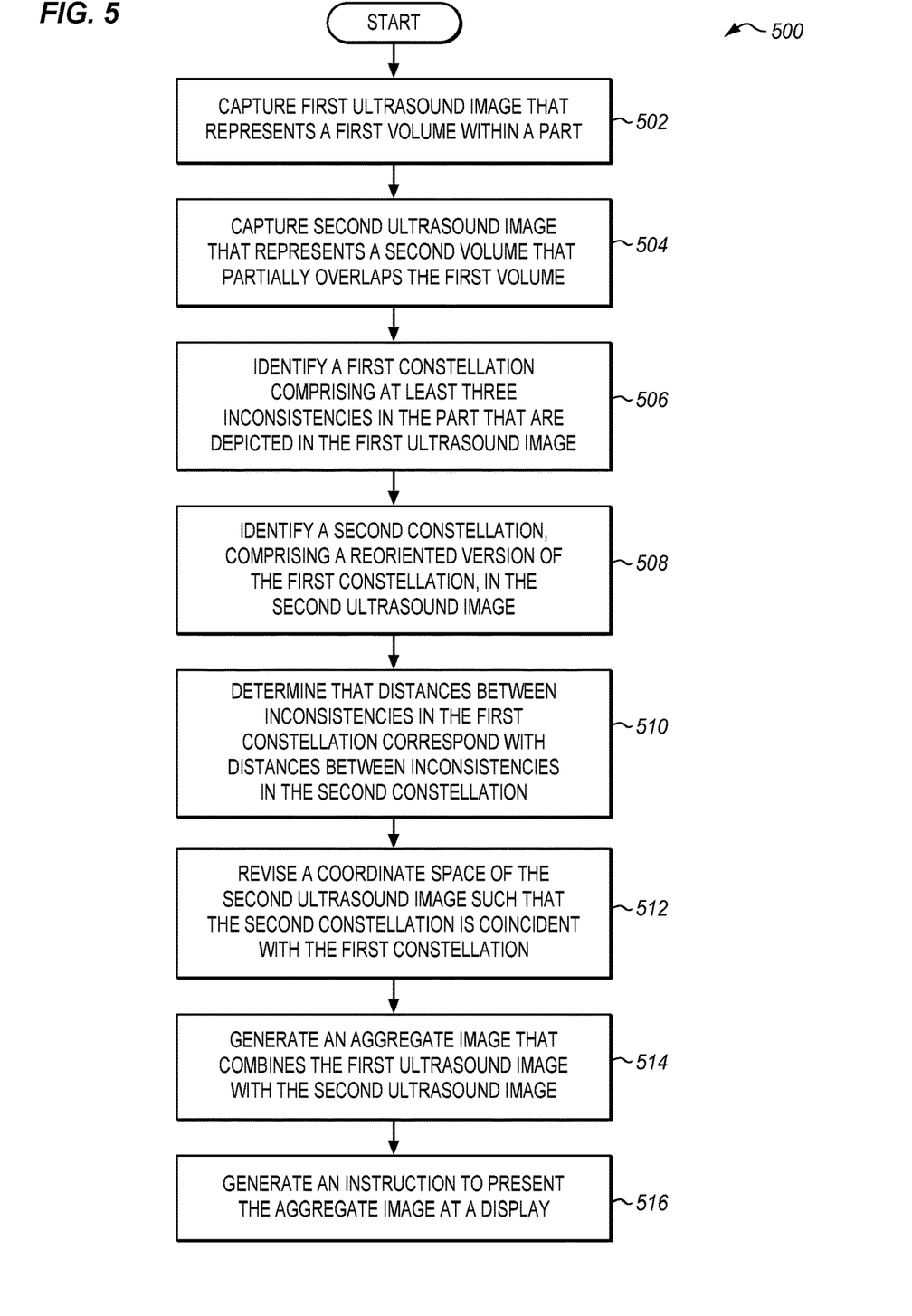
FIG. 5 is a flowchart illustrating a method for combining ultrasound images in an illustrative embodiment.

FIG. 5 is a flowchart illustrating a method 500 for combining ultrasound images in an illustrative embodiment. The steps of method 500 are described with reference to imaging system 250 and transducer 240 of FIG. 2, but those skilled in the art will appreciate that method 500 may be performed in other ultrasound systems as desired. The steps of the flowcharts described herein are not all inclusive and may include other steps not shown. The steps described herein may also be performed in an alternative order.

Controller 270 operates transducer 240 to capture a first ultrasound image that represents first volume 410 of part 400 (step 502). This may comprise generating ultrasonic waves at transducer 240, detecting those waves at transducer 240 after the waves have returned to transducer 240, and processing the timing, angle, and/or magnitude of the waves in order to generate an image of first volume 410. Transducer 240 may then be placed at a new location in order to acquire an image of part 400 (e.g., a portion that overlaps the portion shown in the first ultrasound image). Controller 270 operates transducer 240 to capture a second ultrasound image that represents a second volume of part 400 that partially overlaps the first volume 410 (step 504). For example, the second ultrasound image may represent second volume 420, which overlaps part of first volume 410. The capture of the second ultrasound image may be performed in a similar manner to step 502.

Controller 270 may further capture even more images until the entirety of part 400 has been imaged. At this point in time, it may be desirable to "stitch" together the individual images in order to form an aggregate image that provides a holistic/integral view of the part. To this end, controller 270 attempts to identify common features found in both the first image and the second image. This may occur by identifying the same constellation of features shared between multiple overlapping images. The constellation should be in the image overlap in order to enable formation of the aggregate image. If no constellation is found within the overlap between two images, another image may be acquired or reviewed that has a greater (or different) overlap that has the potential to have captured a shared constellation. While discussion is provided with regard to the first and second image, it should be understood that any two images which depict at least partially overlapping volumes may be aligned via the steps described below. Furthermore, the inconsistencies within the constellation may comprise pores or other features which are within production tolerances for the part.

Controller 270 identifies a first constellation 450 comprising at least three inconsistencies in part 400 that are depicted in the first ultrasound image (step 506). A constellation comprises a spatial pattern defined by at least three inconsistencies. For example, a constellation may comprise a unique shape defined by three, four, five, etc. inconsistencies. Including more inconsistencies in a constellation increases the accuracy at which the constellation is detected in other images. However, this may also increase processing time. Multiple constellations may be identified and/or defined by controller 270 during this step. In this case, the first constellation comprises inconsistencies 414.

Controller 270 identifies a second constellation 460 (e.g., comprising at least three inconsistencies in part 400 that are depicted in the second ultrasound image) comprising a reoriented version of the first constellation, in the second ultrasound image (step 508). However, at this point in time, controller 270 may be unaware that the second constellation is a reoriented version of the first constellation. Thus, according to controller 270, the second constellation is a candidate that may or may not match the first constellation. Controller 270 analyzes the distances between the inconsistencies in the second constellation to determine if they correspond with distances between the inconsistencies 414 in the first constellation. The distances between the inconsistencies 414 may be calculated as real-world distances, and may be based on a known resolution of transducer 240. In embodiments where different types of transducers are used to take different images, the resolution of each transducer may be accounted for when calculating distance, in order to ensure that the images all use the same scale.

In this case, the second constellation comprises inconsistencies 414. Controller 270 therefore determines that distances between inconsistencies in the first constellation correspond with distances between inconsistencies in the second constellation (step 510). For example, each distance between inconsistencies in the first constellation may be equal or within a threshold amount of a distance between inconsistencies in the second constellation. An example threshold amount may be a millimeter, a thousandth of an inch, two pixels, or any other suitable amount.

Controller 270 revises a coordinate space of the second ultrasound image such that the second constellation is coincident with the first constellation (step 512). This may comprise performing a coordinate space translation and rotation of the second ultrasound image. Such a translation and rotation may involve the following operations in one embodiment. For the first ultrasound image, the coordinates of every point in the first constellation are translated such that one of inconsistencies 414 is located at (0,0,0). This forms a translation referred to as $T_1$, which may be expressed as a vector (matrix). The coordinates of every point in the first image may then be rotated such that a another of inconsistencies 414 is at $(0,y_2',z_2')$, and the coordinates of the first image may be further rotated such that a third of inconsistencies 414 is located at $(0,0,y_3')$. This forms a rotation referred to as $R_1$, which may be expressed as a matrix.

For the second image, the same three operations may be performed on three inconsistencies 414 in the second constellation. This forms a translation $T_2$ and a rotation $R_2$, which may be expressed as matrices. Consider the original position of a point m in an image n $X_{mn}$. For such a point, $T_1+X_{11}=(0,0,0)=T_2+X_{12}$. This may be rephrased as $R_1$ $(T_1+X_{11})=R_2$ $(T_2+X_{12})$. Likewise, $R_1$ $(T_1+X_{21})=R_2$ $(T_2+X_{22})$, and $R_1$ $(T_1+X_{31})=R_2$ $(T_2+X_{32})$. Thus, controller 270 may left-multiply by $R_2^{-1}$ and untranslate by $T_2$ to arrive at $X_{i2}=-T_2+R_2^{-1}$ $R_1$ $(T_1+X_{i1})$. This relationship is true for any point in the second image, not just the three inconsistencies 414 that were originally used for the transform. Revising the coordinate space may be performed until the coordinate for each inconsistency (X, Y, Z) in the second constellation equals the coordinate of an inconsistency in the first constellation. This accounts for shifts in position and orientation of transducer 240 between the taking of ultrasound pictures, and requires no a priori knowledge of such shifts in order to be performed. Hence, the entire coordinate system of the second image may be revised to conform with the coordinate system of the first image, regardless of the fact that transducer 240 may have moved and/or changed orientation by an unknown amount.

Controller 270 further generates an aggregate image (or requests generation of an aggregate image) that combines the first ultrasound image with the second ultrasound image (e.g., after the coordinate space of the second ultrasound image has been revised) (step 514). Similar techniques may be utilized to combine any suitable images which depict overlapping volumes, and such techniques need not be applied to images sequentially. For example, a first image and seventh image may be used to generate an aggregate image, etc. This may comprise a large "depth-map" style image, a true three dimensional (3D) image, a volumetric image comprising multiple volume elements ("voxels"), etc. The aggregate image may include the volume represented by the first image, as well as the volume represented by the second image. Controller 270 further generates an instruction to present the aggregate image at a display, and directs interface 260 (also referred to as an "I/F") to transmit the instruction to the display (step 516). Thus, an engineer may inspect the entirety of part 400 via a single, integral picture or 3D model shown on the display.

Figure 6:
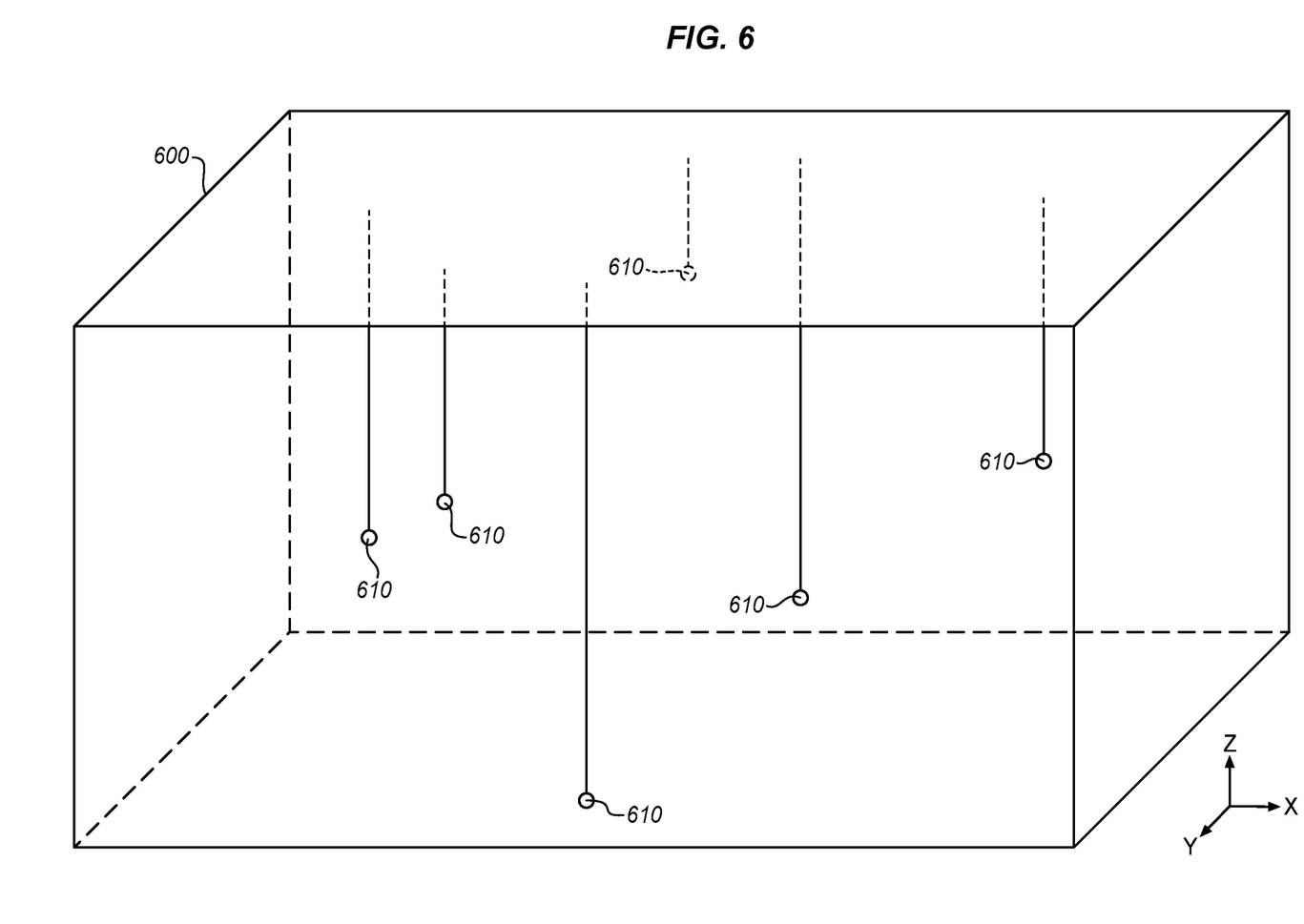
FIG. 6 is a diagram illustrating an aggregate ultrasound image in an illustrative embodiment.

FIG. 6 is a diagram illustrating an aggregate ultrasound image 600 in an illustrative embodiment. In this embodiment, aggregate ultrasound image 600 comprises a volumetric image depicting the location of multiple inconsistencies 610 within a volume. Some inconsistencies 610 may have been originally indicated by a first image, while other inconsistencies 610 may have been originally indicated in a second image.

Figure 7:
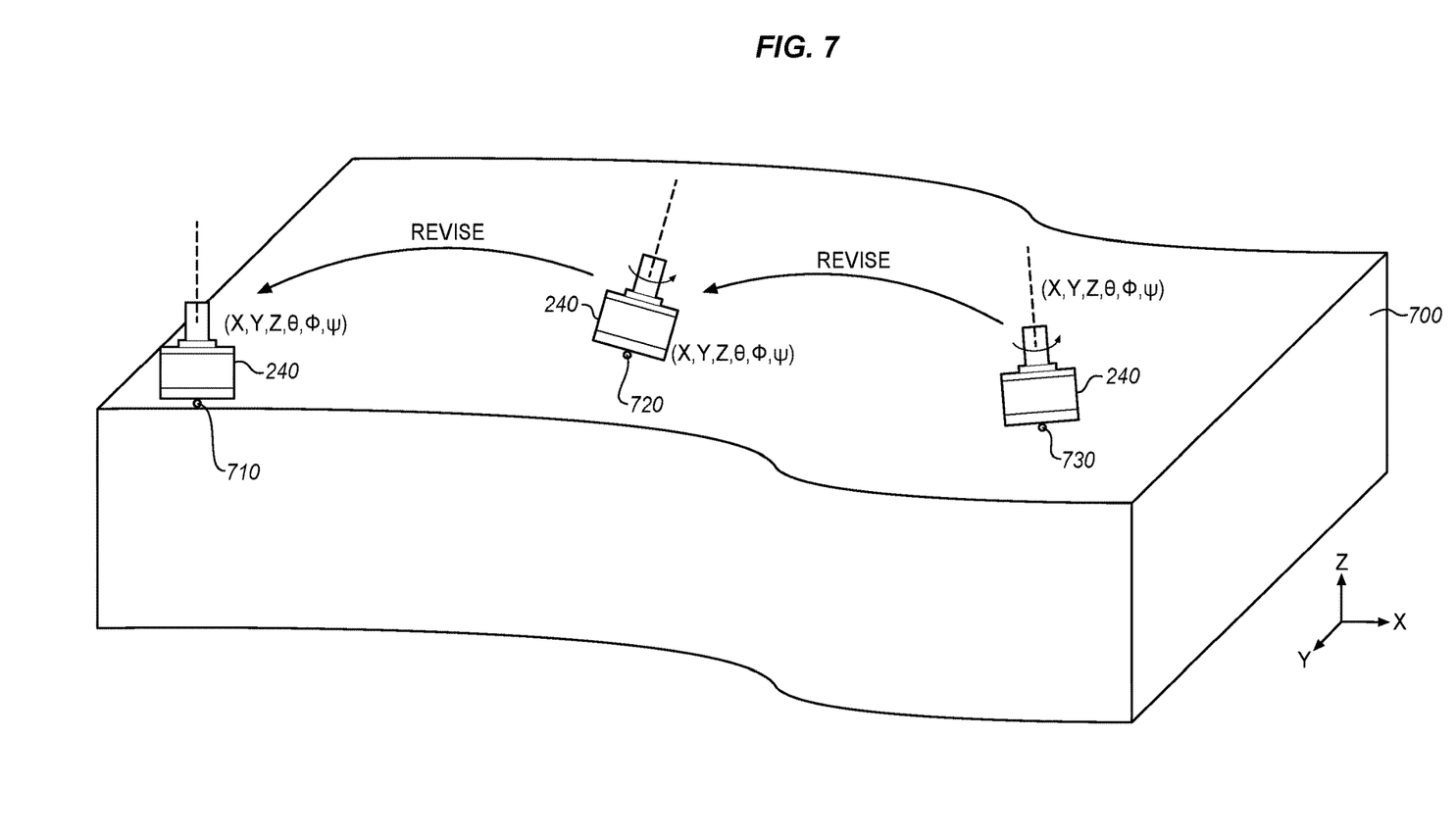
FIG. 7 is a diagram illustrating changing locations of a transducer in an illustrative embodiment.

FIG. 7 is a diagram illustrating changing locations of a transducer 240 in an illustrative embodiment. In this embodiment, transducer 240 captures ultrasound images at multiple locations along part 700. In order to stitch the images together into an aggregate image, controller 270 revises the coordinate space used to take an image at location 720 to match the coordinate space used to take an image at location 710. For the image taken at location 730, controller 270 revises the coordinate space to match the coordinate space used to take an image at location 720. Controller 270 then applies the already-known revision process used for the image at location 720. In this manner, images may be assembled in a chain or sequence without needing all of the images to share common features.

In further embodiments, the techniques described herein may be utilized to assemble aggregate images of any suitable parts, including parts of the human body. Thus, these techniques may also be applied to medical ultrasound.

EXAMPLES

In the following examples, additional processes, systems, and methods are described in the context of an ultrasound imaging system.

Figure 8:
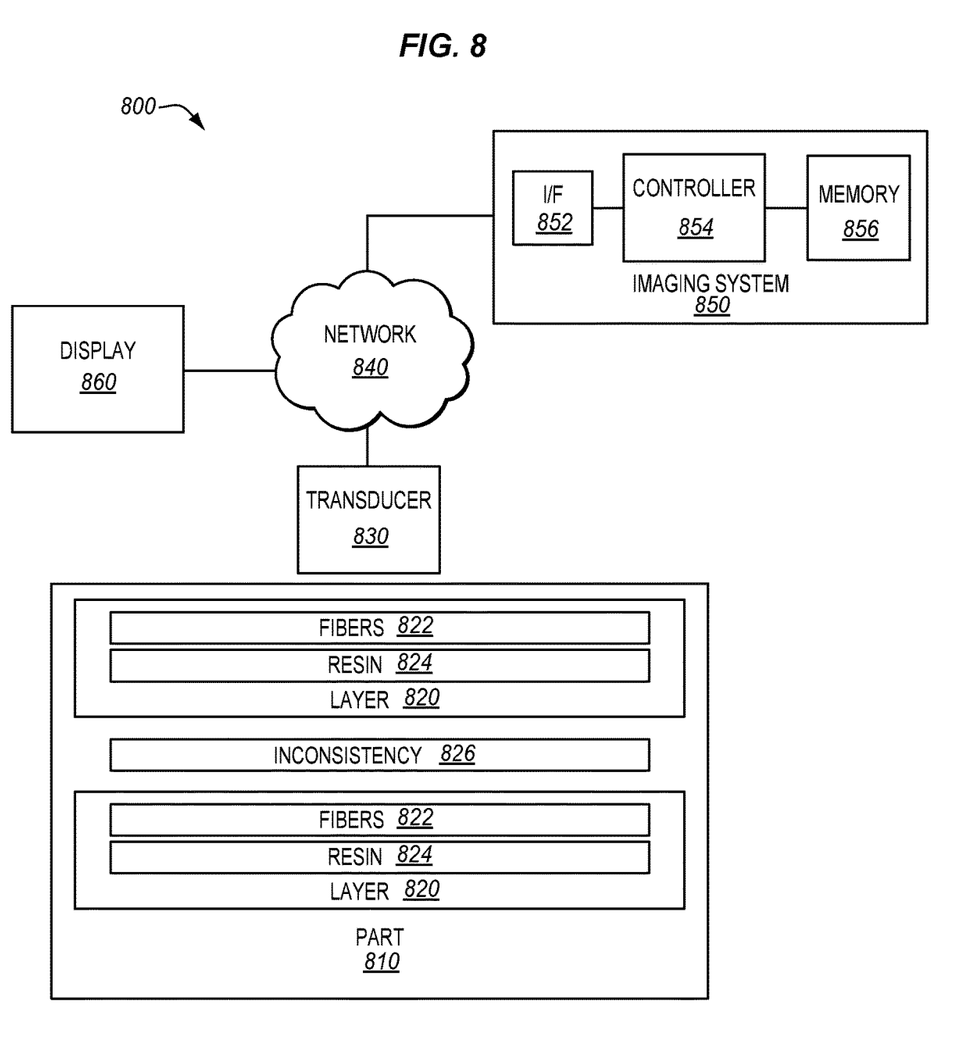
FIG. 8 is a block diagram of an ultrasound imaging environment in an illustrative embodiment.

FIG. 8 is a block diagram of an ultrasound imaging environment 800 in an illustrative embodiment. In this embodiment, a part 810 is being imaged that includes multiple layers 820. Each layer 820 includes fibers 822 (e.g., carbon fibers) and resin 824. Part 810 also includes one or more inconsistencies 826. Transducer 830 interrogates part 810 via ultrasound, and provides data via network 840 to imaging system 850. I/F 852 receives the data, and controller 854 generates ultrasound images based on the data. The ultrasound images are stored in memory 856. Controller 854 also generates an aggregate image from the ultrasound images stored in memory 856, and generates instructions, transmitted via I/F 852 to display 860, that results in display 860 presenting the aggregate image. Note that while in this embodiment inconsistencies are illustrated as interlaminar pores, in further embodiments, inconsistencies 826 may comprise tow gaps, overlaps, etc.

Figure 9:
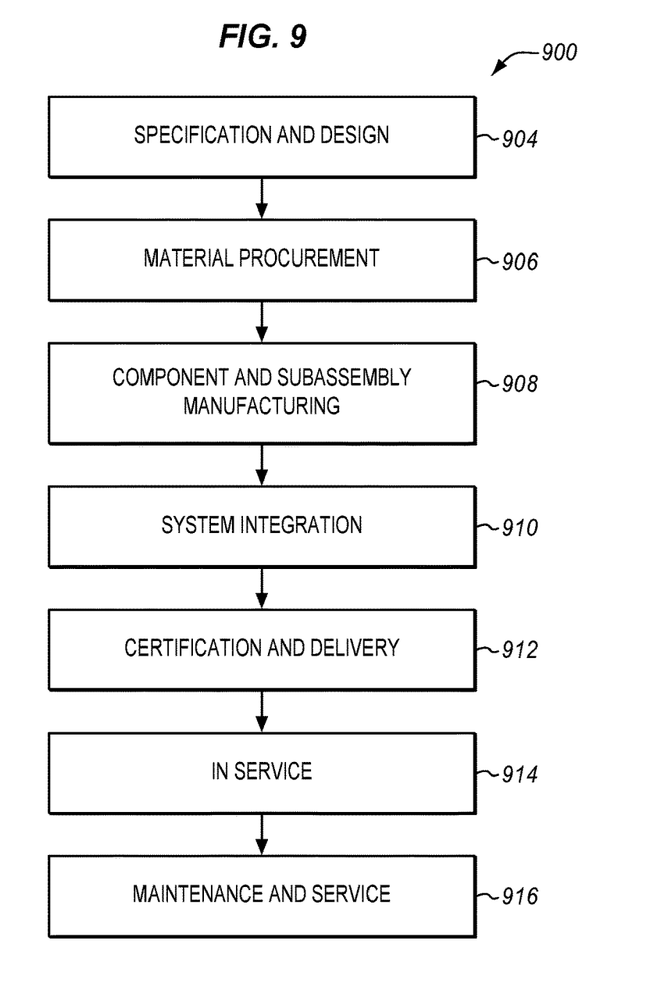
FIG. 9 is a flow diagram of aircraft production and service methodology in an illustrative embodiment.
Figure 10:
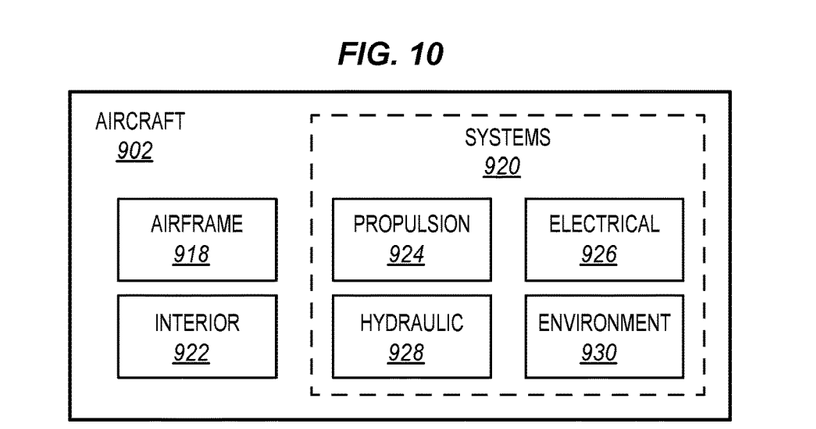
FIG. 10 is a block diagram of an aircraft in an illustrative embodiment.

Referring more particularly to the drawings, embodiments of the disclosure may be described in the context of an aircraft manufacturing and service method 900 as shown in FIG. 9 and an aircraft 902 as shown in FIG. 10. During pre-production, illustrative method 900 may include specification and design 904 of the aircraft 902 and material procurement 906. During production, component and subassembly manufacturing 908 and system integration 910 of the aircraft 902 takes place. Thereafter, the aircraft 902 may go through certification and delivery 912 in order to be placed in service 914. While in service by a customer, the aircraft 902 is scheduled for routine maintenance and service 916 (which may also include modification, reconfiguration, refurbishment, and so on). Apparatus and methods embodied herein may be employed during any one or more suitable stages of the production and service method 900 (e.g., specification and design 904, material procurement 906, component and subassembly manufacturing 908, system integration 910, certification and delivery 912, service 914, maintenance and service 916) and/or any suitable component of aircraft 902 (e.g., airframe 918, systems 920, interior 922, propulsion 924, electrical 926, hydraulic 928, environmental 930).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 902 produced by illustrative method 900 may include an airframe 918 with a plurality of systems 920 and an interior 922. Examples of high-level systems 920 include one or more of a propulsion system 924, an electrical system 926, a hydraulic system 928, and an environmental system 930. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 900. For example, components or subassemblies corresponding to production stage 908 may be fabricated or manufactured in a manner similar to components or subassemblies produced while the aircraft 902 is in service. Also, one or more apparatus embodiments, method embodiments, or a combination thereof may be utilized during the production stages 908 and 910, for example, by substantially expediting assembly of or reducing the cost of an aircraft 902. Similarly, one or more of apparatus embodiments, method embodiments, or a combination thereof may be utilized while the aircraft 902 is in service, for example and without limitation, to maintenance and service 916. For example, the techniques and systems described herein may be used for steps 906, 908, 910, 914, and/or 916, and/or may be used for airframe 918 and/or interior 922. These techniques and systems may even be utilized for systems 920, including for example propulsion 924, electrical 926, hydraulic 928, and/or environmental 930.

In one embodiment, a part 100 comprises a portion of airframe 918, and is manufactured during component and subassembly manufacturing 908. Part 100 is inspected via the ultrasound techniques described above. Part 100 may then be assembled into an aircraft in system integration 910, and then be utilized in service 914 until wear renders part 100 unusable. Thus, part 100 may also be inspected during service 914 via the ultrasound techniques described above. Then, in maintenance and service 916, part 100 may be discarded and replaced with a newly manufactured part. Inventive components and methods may be utilized throughout the steps described above in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising:
capturing a first ultrasound image that represents a first volume within a part that is manufactured;
capturing a second ultrasound image that represents a second volume within the part that partially overlaps the first volume;
identifying a first constellation comprising at least three inconsistencies in the part that are depicted in the first ultrasound image;
identifying a second constellation, comprising a reoriented version of the first constellation, in the second ultrasound image; and
generating an aggregate image that combines the first ultrasound image with the second ultrasound image.

2. The method of claim 1 further comprising:
determining that distances between the inconsistencies in the first constellation correspond with distances between inconsistencies in the second constellation.

3. The method of claim 2 wherein:
distances correspond with each other when they are within a threshold amount of each other.

4. The method of claim 1 wherein:
the inconsistencies are disposed beneath a surface of the part.

5. The method of claim 1 further comprising:
revising a coordinate space of the second ultrasound image such that the second constellation is coincident with the first constellation.

6. The method of claim 5 wherein:
the second constellation is coincident with the first constellation when each inconsistency in the second constellation shares a coordinate with an inconsistency in the first constellation.

7. The method of claim 1 wherein:
inconsistencies are represented by picture elements in an ultrasound image that have a depth which is different than a thickness of the part.

8. The method of claim 1 wherein:
the first ultrasound image and the second ultrasound image comprise depth maps indicating, for each of multiple surface locations on the part, a depth at which a highest magnitude return was detected by a transducer.

9. The method of claim 1 wherein:
revising a coordinate space of the second ultrasound image by translating and rotating the second ultrasound image.

10. The method of claim 1 wherein:
the part comprises a composite part, and the inconsistencies comprise pores in the composite part.

11. The method of claim 1 further comprising:
determining a change in position and orientation of a transducer that captured the first ultrasound image and the second ultrasound image.

12. A non-transitory computer readable medium embodying programmed instructions which, when executed by a processor directing a transducer, are operable for performing a method comprising:
identifying a first constellation comprising at least three inconsistencies in a part that is manufactured, wherein the inconsistencies are depicted in a first ultrasound image that represents a first volume within a part;

identifying a second constellation comprising a reoriented version of the first constellation, the second constellation is in a second ultrasound image that represents a second volume within the part that partially overlaps the first volume;

determining that distances between inconsistencies in the first constellation correspond with distances between inconsistencies in the second constellation;

revising a coordinate space of the second ultrasound image such that the second constellation is coincident with the first constellation; and generating an aggregate image that combines the first ultrasound image with the second ultrasound image after the coordinate space of the second ultrasound image has been revised.

13. The medium of claim 12 wherein:
the second constellation is coincident with the first constellation when each inconsistency in the second constellation shares a coordinate with an inconsistency in the first constellation.

14. The medium of claim 12 wherein:
inconsistencies are represented by picture elements in an ultrasound image that have a depth which is different than a thickness of the part.

15. The medium of claim 12 wherein:
distances correspond with each other when they are within a threshold amount of each other.

16. The medium of claim 12 wherein:
the first ultrasound image and the second ultrasound image comprise depth maps indicating, for each of multiple surface locations on the part, a depth at which a highest magnitude return was detected by a transducer.

17. The medium of claim 12 wherein:
revising the coordinate space of the second ultrasound image comprises translating and rotating the second ultrasound image.

18. The medium of claim 12 wherein:
the part comprises a composite part, and each inconsistency comprises a pore in the composite part.

19. The medium of claim 12 further comprising:
determining a change in position and orientation of the transducer between capturing the first ultrasound image and the second ultrasound image.

20. A system comprising:
an imaging system comprising an interface, a controller, and a memory, the controller receives a first ultrasound image that represents a first volume within a part that is manufactured, receives a second ultrasound image representing a second volume within the part that partially overlaps the first volume, and stores the first ultrasound image and the second ultrasound image in the memory, the controller identifies a first constellation comprising at least three inconsistencies in the part that are depicted in the first ultrasound image, and identifies a second constellation comprising at least three inconsistencies in the part that are depicted in the second ultrasound image;

the controller determines that distances between inconsistencies in the first constellation correspond with distances between inconsistencies in the second constellation, and revises a coordinate space of the second ultrasound image such that the second constellation is coincident with the first constellation; and the controller requests generation of an aggregate image that combines the first ultrasound image with the second ultrasound image after the coordinate space of the second ultrasound image has been revised.

21. The system of claim 20 wherein:
the second constellation is coincident with the first constellation when each inconsistency in the second constellation shares a coordinate with an inconsistency in the first constellation.

22. The system of claim 20 wherein:
inconsistencies are represented by picture elements in an ultrasound image that have a depth which is different than a thickness of the part.

23. The system of claim 20 wherein:
distances correspond with each other when they are within a threshold amount of each other.

24. An apparatus comprising:
a memory that stores ultrasound images of a part; and
a controller that identifies a first constellation comprising at least three inconsistencies in the part that is manufactured, wherein the inconsistencies are depicted in a first ultrasound image of a first volume of the part, and identifies a second constellation comprising at least three inconsistencies in the part that are depicted in a second ultrasound image in a second volume of the part;

the controller determines that distances between inconsistencies in the first constellation correspond with distances between inconsistencies in the second constellation, and revises a coordinate space of the second ultrasound image such that the second constellation is coincident with the first constellation; and the controller requests generation of an aggregate image that combines the first ultrasound image with the second ultrasound image after the coordinate space of the second ultrasound image has been revised.

25. The apparatus of claim 24 wherein:
the second constellation is coincident with the first constellation when each inconsistency in the second constellation shares a coordinate with an inconsistency in the first constellation.

26. The apparatus of claim 24 wherein:
inconsistencies are represented by picture elements in an ultrasound image that have a depth which is different than a thickness of the part.

27. The apparatus of claim 24 wherein:
distances correspond with each other when they are within a threshold amount of each other.

* * * * *